United States Patent [19]

Millette et al.

[11] 4,051,430
[45] Sept. 27, 1977

[54] APPARATUS FOR MEASURING, AND INDICATING, THE THICKNESS OF A NON-METALLIC COATING OF AN ARCUATE METAL SURFACE

[75] Inventors: Louis Guy Millette, Pointe Claire; Peter Murphy, Longueuil; Georges Michel Miller, Chateauguay, all of Canada

[73] Assignee: Northern Telecom Limited, Montreal, Canada

[21] Appl. No.: 698,009

[22] Filed: June 21, 1976

[30] Foreign Application Priority Data

Apr. 30, 1976 Canada ............................. 251592

[51] Int. Cl.² .................................... G01R 33/12
[52] U.S. Cl. ................................... 324/34 TK
[58] Field of Search ............... 324/34 R, 34 TK, 34 E, 324/40, 37

[56] References Cited

U.S. PATENT DOCUMENTS 3,919,628  11/1975  Mandula et al. .................... 324/37

FOREIGN PATENT DOCUMENTS 213,317  9/1956  Australia .......................... 324/34 E

*Primary Examiner*—Robert J. Corcoran
*Attorney, Agent, or Firm*—Sidney T. Jelly

[57] ABSTRACT

A measuring head using the electrical inductive principle has at least one probe with a surface for presentation to a surface of a non-metallic coating over an arcuate metallic surface, the thickness of which coating is to be measured. To offset the varying inductive effects caused by variations in diameter of the article being measured, the surface of the probe is profiled—having a Vee shaped profile. The profile is such that articles, such as cables, of smaller diameter enter the Vee shaped profile deeper than larger diameter articles. By this means only variations in inductive effect resulting from variations in coating thickness occur.

3 Claims, 7 Drawing Figures

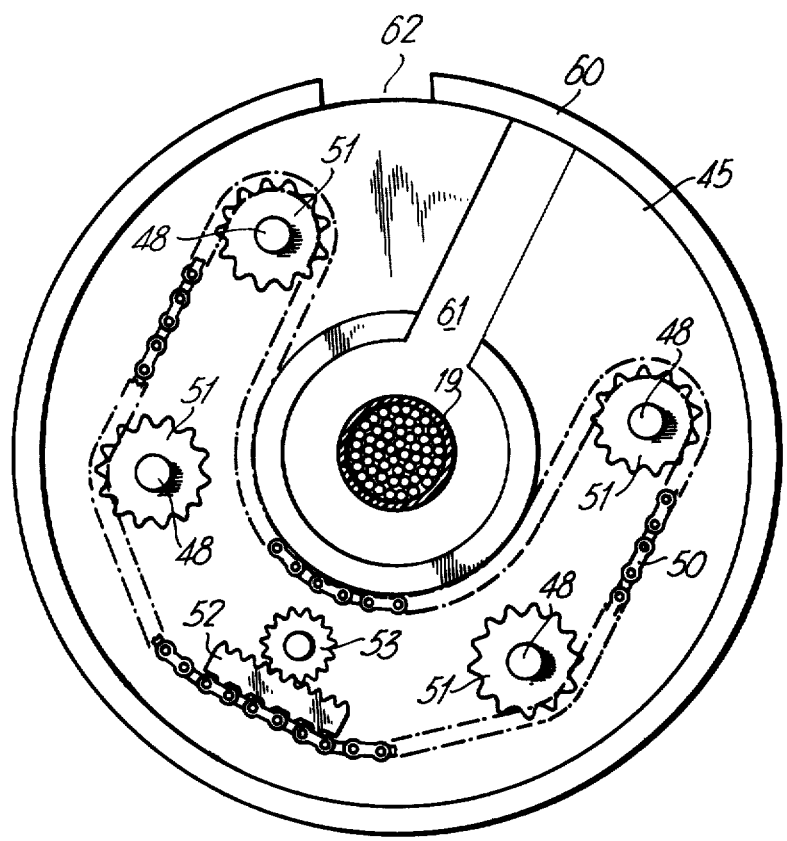
Fig-7-

APPARATUS FOR MEASURING, AND INDICATING, THE THICKNESS OF A NON-METALLIC COATING OF AN ARCUATE METAL SURFACE

This invention relates to wall thickness measuring heads for measuring the thickness of non-metallic coatings, over a metallic surface, such as used for jacketting or sheathing electrical cables, for example and similar structures.

With the desire to maintain the thickness of the coating of a cable or similar object, at the thinnest possible level, while still obtaining satisfactory jacketting, it is necessary to be able to measure the wall thickness of the coating accurately. Such desire for the thinnest possible coating arises from economical requirements and also to reduce the amount of a product which can be in short supply.

For many years the conventional way of measuring wall thickness has been by the use of a measuring device of an electrical capacitance form. Such a device has been extremely stable and calibration tables could and were initially provided which were applicable for the life of the device and also to each of several such devices.

However the capacitance form has certain disadvantages and has become outdated. Thus, the gauge or measuring head is very sensitive to the presence of water on the jacket. Even quite small amounts of water on the jacket cause large variations in the signal from the measuring head. Also, any variation in the coating material effects the measuring head, requiring recalibration. This is an extremely important point as with present day developments and variations in supply of raw materials, and prices of such raw materials, changes are often made in the extruded material. Some changes may be very minor but still cause large variations in signal output. Introductions of a new product also causes problems in that new calibrations charts or tables need to be prepared for each new product. Such changes of material and introduction of new products occur more frequently now than used to be the case, where the product, and its coating or jacketting material, remained unchanged for a long time — many years.

To provide accurate measurement and to give a representative indication of wall thickness around the periphery of the cable, a measuring head was mounted for rotation round the cable, being held stationary at predetermined positions for readings to be made. Typically, the head would be stepped round the cable, stopping at eight positions, i.e. at 45° intervals.

The present invention provides a measuring head using the inductive principle. It is more accurate, less costly to produce, is easily calibrated and is insensitive to variations in the dielectric and physical properties of the non metallic jacketting material. The measuring head embodies a probe which has a specific form to provide for increased accuracy, and which accommodates variations in outer diameter of the jacketted structure without unacceptably varying the signal output.

The invention will be readily understood by the following description, in conjunction with the accompanying drawings, in which:

FIG. 7 is an end view of the apparatus of FIG. 6, illustrating the actuating gear.

Figure 2:
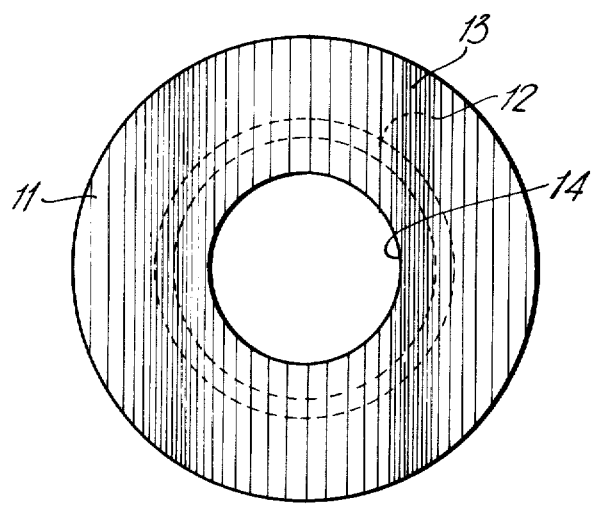
FIG. 2 is a plan view of the probe of FIG. 1, on the contacting surface.
Figure 1:
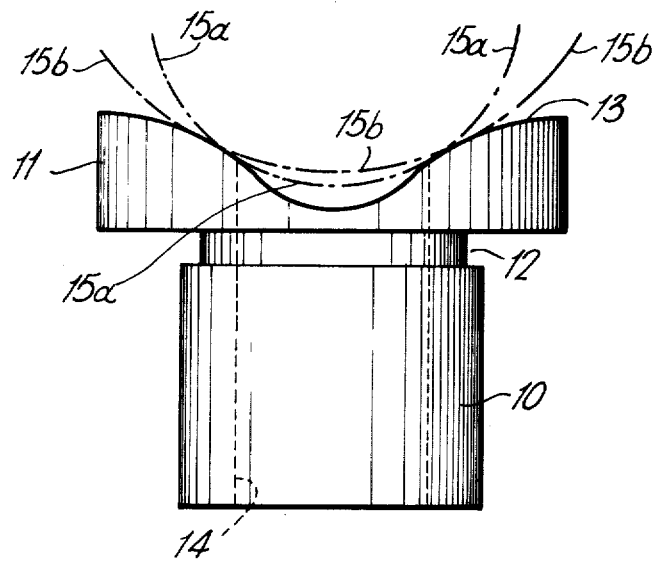
FIG. 1 is a side view of one form of measuring head probe.

FIGS. 1 and 2 illustrate the probe itself, the part actually in contact with, or in close proximity to, the surface of the structure being measured or monitored. The probe has a stem portion 10 and a head portion 11. The stem portion 10 is for mounting in the measuring head — having a coil positioned in a groove 12, as described later. The head portion 11 is circular in plan view, as illustrated in FIG. 2, in the present example and viewed sideways, in a direction coincident with the axis of the cable or other structure being measured, has a contact surface 13 which is profiled in a predetermined manner. The term "contacting surface" is used conveniently, although a small clearance may be maintained between the surface 13 and the cable or other object. A bore 14 extends axially through the probe. Bore 14 can contain a tuning element such as a slug or core of appropriate material, such as ferrite. By such tuning elements an individual head can be tuned, and in an apparatus using a plurality of heads, as described herein, the heads can be matched. The tuning element can vary the sensitivity of the probe and changes the resonant frequency of the probe.

The profile is obtained from calibration curves in such a way that, for a given wall thickness, the reluctance of the associated magnetic circuit remains substantially constant over a range of cable diameters. Since the magnetic influence on the probe will be a function of both, the area and/or mass of the metallic surface, and the distance from the metallic surface and the head, a smaller diameter curved surface must be located closer to the head than a larger diameter curved surface to produce the same effect. With the present invention, a cable of smaller diameter will "penetrate" or "sink" deeper into the profile than a larger diameter cable. This is indicated in FIG. 1, where two cables, or similar structures are indicated at 15a and 15b by chain dotted lines. It will be seen that the smaller diameter structure 15a enters the profile deeper than the larger diameter structure 15b.

The profile of the surface 13 is obtained from calibration data. To obtain the calibration data, a flat detector surface — such as a probe as in FIG. 1 but with a flat contact surface 13, is set-up and a series of mandrels of different known diameters, successively positioned first in contact with the surface and then moved away in small predetermined steps. Thus, for example, a 0.5 inch diameter metal mandrel is first positioned in contact with the detector, which is part of an oscillator circuit, and a note made of the frequency, or some other signal output, of the oscillator circuit. The mandrel is then moved away in small steps — for example 0.005 inch each step, and a series of readings obtained. The same procedure is carried with further mandrels, for example 0.75 inches and 1.0 inch.

Figure 3:
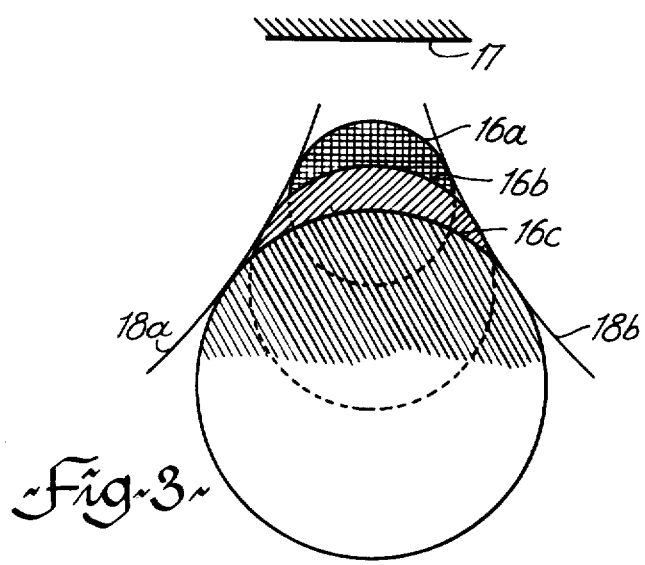
FIG. 3 is a diagrammatic representation of a method of obtaining the profile of the probe.

There are thus obtained three tables, called calibration tables. From these tables it is possible to ascertain at what distance each mandrel must be positioned from the detector surface to give the same calibration reading. It is possible to draw or represent these positions graphically and draw in a curve which is tangential to each mandrel — or representation thereof. This is illustrated in FIG. 3. The positions of three mandrels is indicated at 16a, 16b and 16c at positions from a flat detector surface 17, where the magnetic influence of the various mandrels on the probe and associated oscillator circuit is the same. Curves 18a and 18b are then drawn as tangents to the circles representative of the mandrels 16a, 16b and 16c. These two curves form the profile of the surface 13 for the probe.

Figure 4:
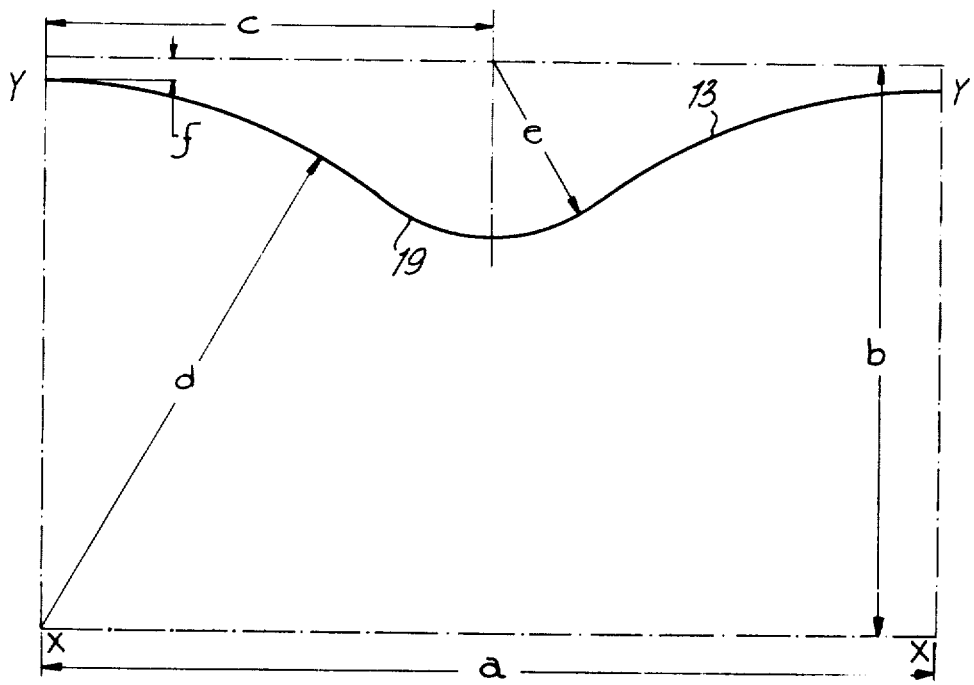
FIG. 4 is an enlarged view of the profile of the probe.

A typical profile is shown, enlarged, in FIG. 4. Typical values for the various parameters are: $a = 0.884$ inch; $b = 0.575$ inch; $c = 0.442$ inch; $d = 0.550$ inch; $e = 0.175$ inch; $f = 0.025$ inch. The important reference points are those designated $x$ and $y$ in FIG. 4.

While the curve has been described as being obtained graphically, as illustrated in FIG. 3, this is a relatively lengthy and not very accurate method and is described for illustrative purposes. Modern computer technology enable the curves 18a and 18b of FIG. 3 to be calculated from the information in the calibration data and tables, previously referred to. Also once various readings have been obtained with the various mandrels relative to the detector surface, calibration tables at closer spacings can be obtained by computer usage.

The bottom portion 19 of the surface 12 is not important. The only requirement is that it not touch the surface of the smallest cable to be measured. A typical material for the probe is "Henium", a ceramic material having good wear resistances and low friction. It is difficult to machine and therefore manufacturing problems will tend to dictate the shape of the unimportant portion 19 of the profile.

Figure 5:
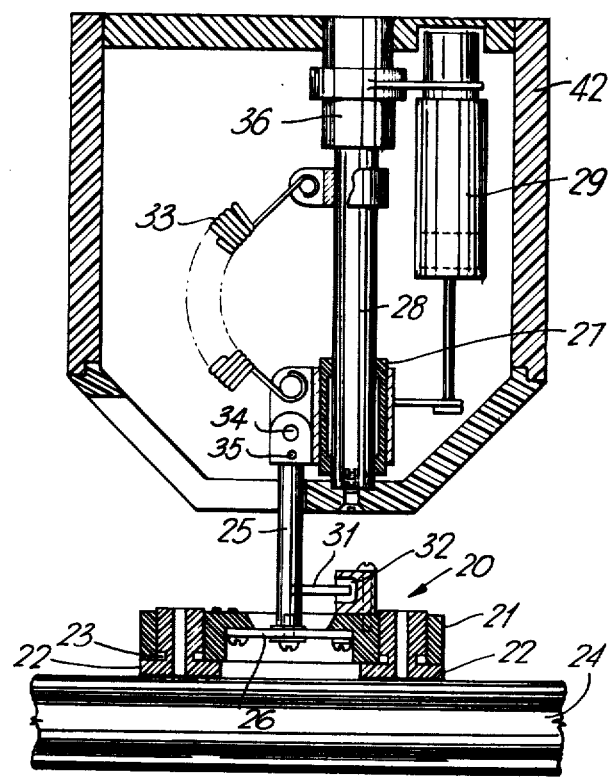
FIG. 5 is a cross-section on the longitudinal axis of a measuring head.

A probe, as in FIGS. 1 to 4, is mounted in a head. An example of such a head is illustrated in FIG. 5, in longitudinal cross-section. This head, and associated support structure, is described in more detail in co-pending application Ser. No. 698,461 filed June 21, 1976, in the name of the present assignee. A measuring head 20 comprises an elongated housing 21. Two probes 22 are mounted in the housing 21, a probe at each end. Only one probe, is active, the other probe inactive. A coil 23 is wound on at least the active probe and forms part of an oscillator circuit. The use of two probes assists in obtaining efficient tracking and location of the measuring head 20 relative to the cable or other structure, indicated at 24. However some other structure, such as a roller, or other device can be used in place of the inactive probe. The head 20 is attached to a support rod 25 via a flexible diaphragm 26. The rod 25 in turn is attached to a slide member 27 slidable on a rod 28. A damper 29 damps movement of the slide member 27. To restrict the movement of the head 20 beyond desirable limits, a short projecting member 31 on the rod 25 moves within an enclosure 32 mounted on the housing 21. A spring 33 provides a load on the slider member 27. In the particular example, the rod 25 is pivotally attached to the slide member 27 by a pin 34. A shear pin 35 prevent pivoting of the rod 25, except in emergencies. Rod 28 is attached to a support member 36.

Figure 6:
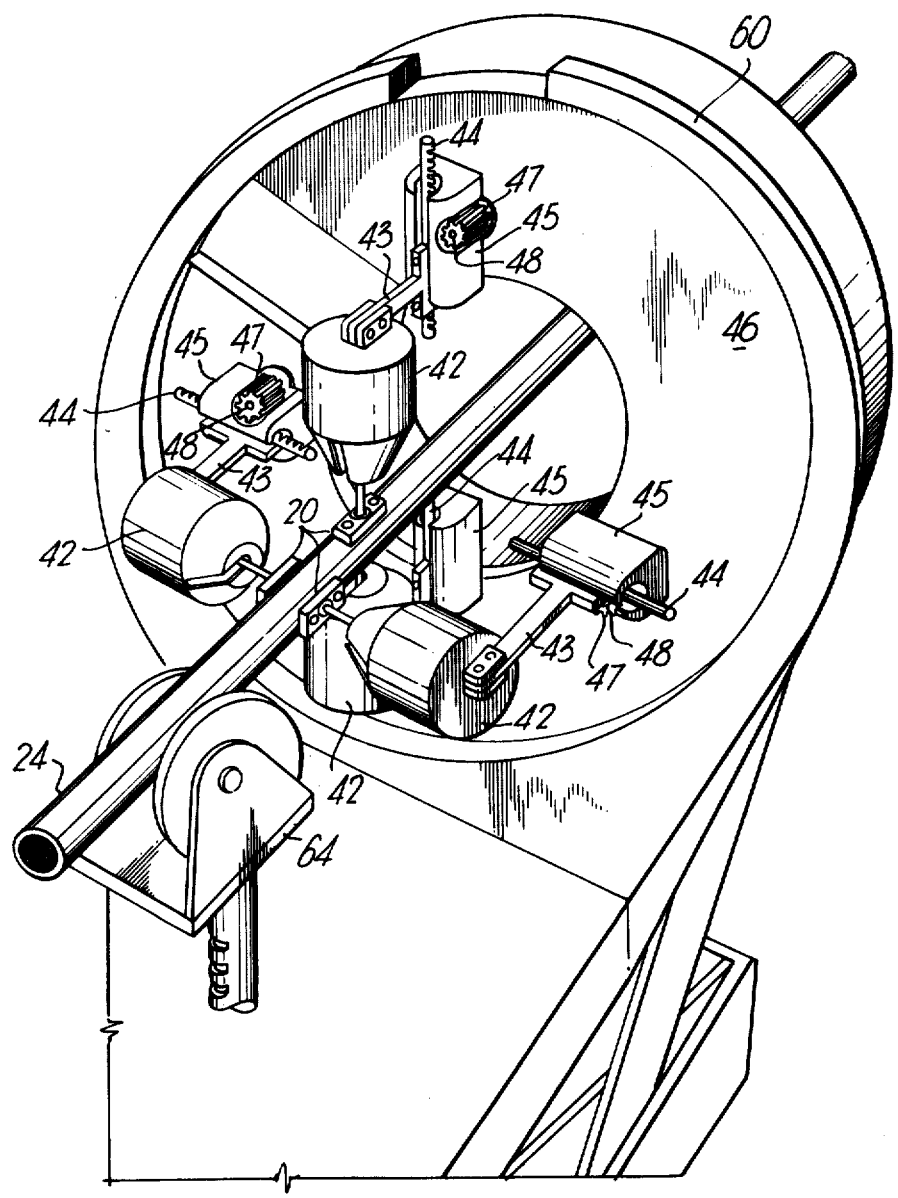
FIG. 6 is a perspective view of one form of apparatus embodying the form of probe as in FIGS. 1, 2, 3 and 4.

FIG. 6 illustrates one form of tracking apparatus using four measuring heads having probes of the form of FIGS. 1 to 4. In the arrangement of FIG. 6, four measuring heads, three of which are indicated generally at 20, are supported around the cable 24, at 90° intervals. The measuring heads, as illustrated each have a support structure generally as in FIG. 5, enclosed in a housing 42. The housings contain support members as members 36 in FIG. 5. The housings 42 are supported by cantilevers 43 attached to radially slidable racks 44. The racks 44 are slidably supported in brackets 45 mounted on a support structure 46. Extending axially from the support structure 46 are four pinions 47 fixed on shaft 48, a pinion adjacent to each bracket 45 and engaging with a rack 44.

Each shaft 48 has a chain gear on its rear end, a chain passing over each chain gear and being removed by a sector gear and motor. FIG. 7 illustrates diagrammatically an arrangement of chain 50 and chain gear 51, the sector gear 52 and a chain gear 53 from a motor — not shown. Actuation of the motor rotates the chain gear — in one direction or the other — moving the sector gear 52 and thus chain 50. This in time rotates the shafts 48 via the gears 51, and in turn rotates pinions 49 to move the racks 43, with the measuring heads 10, radially in or out. Such movement will occur as initial setting up or breaking down of the apparatus or to avoid a bump in the cable. A bump detector can be provided upstream of the apparatus and arranged to actuate the motor to withdraw the heads 11.

The structure 46 is mounted within an outer ring 60, and can rotate within the ring to a limited extent. A gap 61 is provided in the structure 46 and a similar gap 62 in the ring 60. By aligning the gaps 61 and 62, the whole apparatus can be lowered from around a cable by the support structure 63. It can also, of course, be raised up around a cable. The cable 24 is supported on either side of the structure 46 by movable supports 64, one of which is seen in FIG. 6.

The cable is moved axially between the heads 20 and the probes (22 in FIG. 5) slide on the cable surface. The frequency of the oscillator circuit associated with a particular probe will be varied by any variation of the thickness of the extruded jacket on the cable. The use of at least four measuring heads enables an indication of circumferential thickness, ovality and lack of concentricity to be obtained. A system embodying the above described probe, measuring head and tracking apparatus, with related indication and display means is described in copending application Ser. No. 698,008 filed June 21, 1976 in the name of the present assignee.

What is claimed is:

1. Apparatus for measuring, and indicating, the thickness of a non-metallic coating on an arcuate metal surface, comprising:

at least one measuring head for positioning relative to said coating;

at least one support member on each measuring head for supporting said measuring head relative to said coating;

a sensing member on each measuring head and arranged to develop a signal representative of the distance between said sensing member and said arcuate metal surface;

a profiled surface on said support member for presentation to said coating, said profiled surface having a Vee shape with convex arcuate sides when viewed in a direction parallel to the axis of the arcuate metal surface, the arcuate sides initially defined by sequentially positioning a series of metal cylindrical mandrels of different diameters relative to the sensing member with the axes of the mandrels lying in a common plane normal to the sensing member, so as to develop a signal of the same magnitude from the sensing member for each mandrel, each arcuate side being a curve which is tangential to the peripheries of the mandrels, at these respective positions, the penetration of said arcuate metal surface and coating into said Vee shape varying with the outer diameter of the coating to offset variations in the signal resulting from variations in the outer diameter of the non-metallic coating.

2. Apparatus as claimed in claim 1, said measuring head comprising an electrically inductive member.

3. Apparatus as claimed in claim 2, said electrically inductive member comprising a coil having an axial bore, and a tuning element in said bore.

* * * * *